July 31, 1928.
A. E. LINGO
1,679,313
FLAGPOLE CONSTRUCTION
Filed April 28, 1925
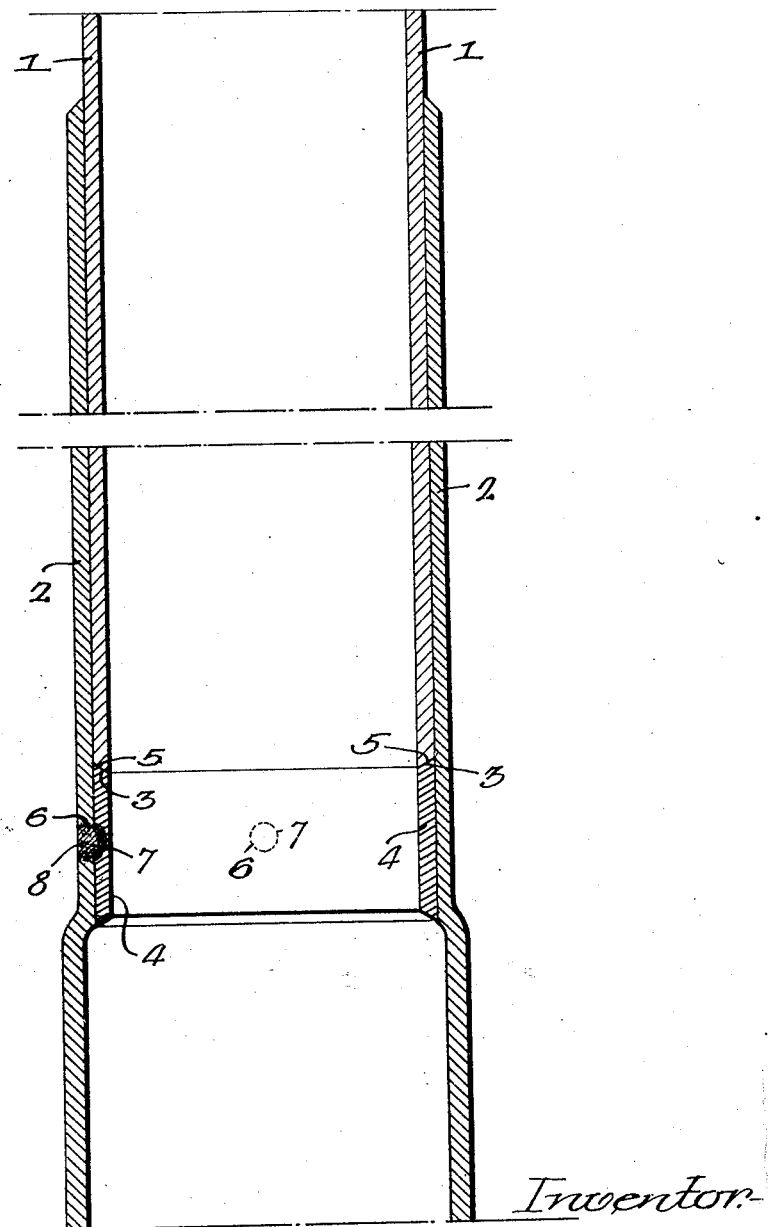
Inventor.
Archibald E. Lingo.
by his Attorneys.
Howson & Howson.

Patented July 31, 1928.

1,679,313

UNITED STATES PATENT OFFICE.

ARCHIBALD E. LINGO, OF COLLINGSWOOD, NEW JERSEY.

FLAGPOLE CONSTRUCTION.

Application filed April 28, 1925. Serial No. 26,514.

My invention relates to means for and method of securing together two elements subject to forces tending to separate the same, and it has particular relation to flagpole constructions.

One object of my invention is to provide a method of securing together two elements subject to heavy loads, which shall strengthen rather than weaken the points at which said elements are secured together.

Another object of my invention is to provide a sectional flag-pole construction which shall be characterized by its simplicity of design, rigidity of construction and ease of assembly, particularly in the field.

With these and other objects and applications in mind, my invention further consists in the details of construction and arrangement, hereinafter described and claimed in the accompanying drawing, wherein The single figure of the drawing is a vertical sectional view of a pole construction embodying my invention.

The embodiment of my invention illustrated in the drawing represents a specific construction which has proved satisfactory in practice, and it is understood that my invention in its broader aspect is not to be limited to the precise details therein shown. This construction comprises an upper pole section 1 which is mounted in telescopic engagement with a supporting pole section 2, so as to be easily detachable therefrom. A supporting shoulder 3 is provided by a ring 4 which is also mounted in a telescopic engagement with the lower pole section 2 and positioned to engage a lower edge 5 of the upper pole section 1. The shoulder 3 and the lower edge 5 are preferably chamfered, as shown in the drawing.

As a result of much practical experience in the construction of flag-poles and the like, I have observed that when bolts or headless tap screws are employed to secure the supporting ring 4 to the pole section 2, shearing occurs due to the heavy loads on the upper pole section 1. If the diameter of the bolts is increased, then the supporting ring 4 is correspondingly weakened. The present invention avoids these undesirable results by providing contiguous recesses 6 and 7 in adjacent portions of the supporting ring 4 and the lower flag section 2, which are filled with metal 8. The metal 8 is then welded by means of plug-welding apparatus to the supporting ring 4 and to the pipe section 2. The welding operation also causes the welding together of the metal of the supporting ring 4 and the pipe section 2 immediately adjacent to the recesses 6 and 7. Thus instead of the pole construction being weakened by securing the supporting ring 4 in position, it is strengthened or reinforced.

While I have shown only one form of embodiment of my invention, it is apparent that various changes and modifications may be made therein without departing from the spirit of my invention. I desire, therefore, that only such limitations shall be imposed thereon as are indicated in the appended claims or as are demanded by the prior art.

I claim:

1. A sectional flag-pole construction, one section of which is provided with a ring adapted to form a shoulder, said ring and said section being recessed, and added metal in said recess welded to said ring and said section so as to rigidly secure the ring in position, another section of said pole being supported on said shoulder.

2. A sectional pole construction comprising a tubular supporting member, a ring encircled by the same and forming a beveled supporting shoulder for another section of said pole, an adjacent portion of said ring and said member being recessed, and added metal welded to said ring and said member.

3. A flag-pole construction comprising a tubular supporting member, a ring encircled by the inner side thereof, an adjacent portion of said ring and said supporting member being recessed, added metal welded to said ring and said member, and a pole section engaging said supporting ring.

ARCHIBALD E. LINGO.